Dec. 27, 1932.   A. BREVICK   1,892,380
SUPPORT FOR SEATS
Filed April 1, 1931
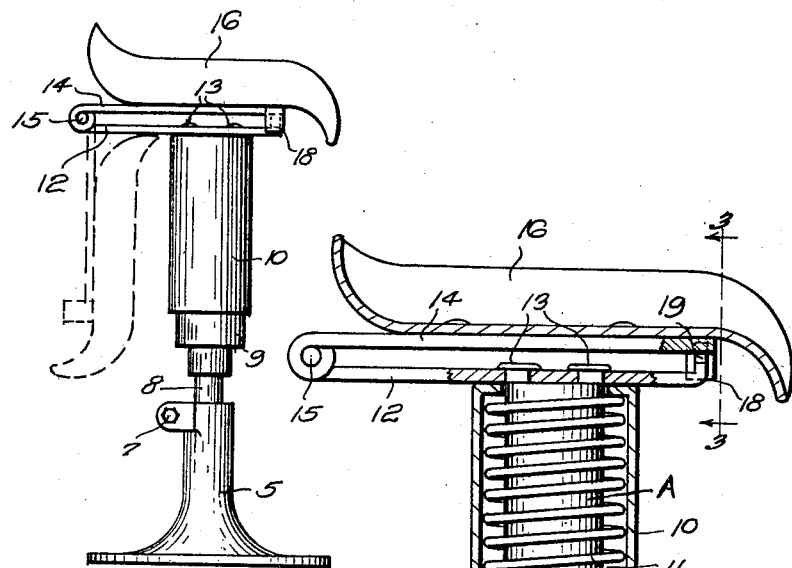
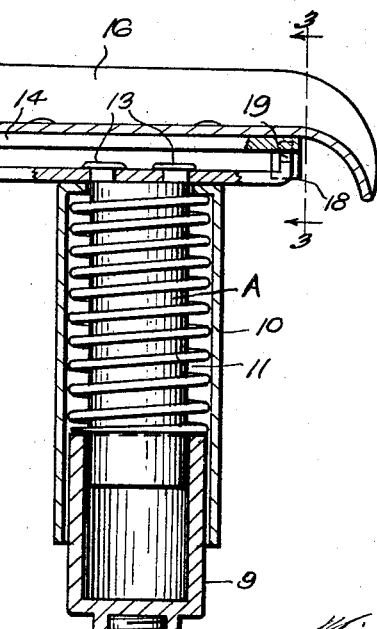
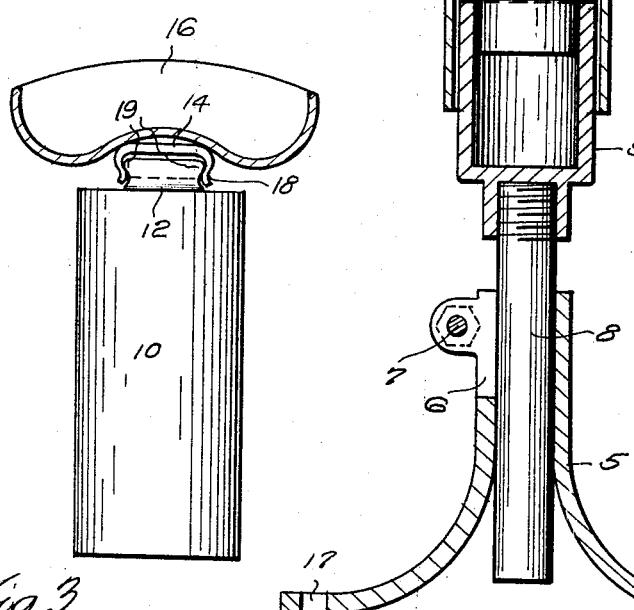
INVENTOR.
Albert Brevick,
BY Samuel Herrick
ATTORNEY.

Patented Dec. 27, 1932

1,892,380

UNITED STATES PATENT OFFICE

ALBERT BREVICK, OF THUNDER HAWK, SOUTH DAKOTA

SUPPORT FOR SEATS

Application filed April 1, 1931. Serial No. 526,905.

This invention relates to seats and more particularly to seats for tractors. As the description proceeds it will be seen that the seat is adapted for use in other relations and particularly upon agricultural implements of various sorts.

The invention will be best understood by reference to the accompanying drawing, wherein Figure 1 is a side elevation of a seat constructed in accordance with the invention.

Figure 2 is a vertical sectional view therethrough and

Figure 3 is a transverse sectional view upon line 3—3 of Figure 2.

Like numerals designate corresponding parts of all the figures of the drawing.

Referring to the drawing, 5 designates a tubular base, the upper portion of which is split at 6 and provided with a draw bolt 7 by which the base may be bound securely to a shank or standard 8 to thereby adjust the vertical portion of said shank with respect to the base.

The upper end of the shank carries a cuplike element 9 upon which a dust cap or sleeve 10 is slidably disposed. A spring 11 is located within the dust cap and bears between the bottom of the cup 9 and the dust cap. A bracket 12 is secured by any suitable type of fastening such as bolts, rivets, or otherwise, indicated at 13, to the top of a shaft A. A plate 14 is hinged to the bracket, at 15, and carries a seat 16. The base may be secured to the tractor (not shown) by bolts (not shown) but which are adapted to pass through openings 17 of the base.

It is clear that the height of the seat may be adjusted by the bolt 7; that the movement of the seat may be cushioned by the spring 11; that the seat may be turned to any desired position of adjustment about the axis constituted by the shank 8 or shaft A, and that the seat may be thrown back to the dotted line position illustrated in Figure 1, so that the operator may stand in front of the sleeve 10 without interference by the seat, when desired, and so that the seat will not fill up with snow or rain, when not in use.

The underside of the forward portion of the seat carries a spring clip 18 that is adapted to engage over an extension 19 of the bracket 12, to hold the seat against accidental upward movement. The shaft A imparts the desired lateral rigidity to the structure while permitting the necessary vertical and rotative motion to the seat.

It is apparent that the device of the present invention is of a simple and economical nature and that it may be easily manufactured and sold independently of tractors and as an article of manufacture. It is clear that other ways will readily suggest themselves to those skilled in the art of assembling the parts and consequently it is to be understood that the invention includes within its purview not only the particular embodiment that I have chosen for purpose of illustration, but any other structure which falls fairly within either the terms or the spirit of the appended claims.

Having described my invention, what I claim is:

1. A device of the character described comprising a two part telescopic structure, the uppermost of which comprises a sleeve-like dust cap and the lowermost of which comprises a cup member upon which said dust cap is slidably disposed, a spring disposed within the dust cap and bearing between said parts, a forwardly and rearwardly extending bracket mounted upon the upper end of said sleeve-like dust cap, a seat hinged to the rear end of said bracket, and a spring detent between the underside of said seat and forward end of said bracket.

2. A structure as recited in claim 1 in combination with a shaft slidable in said cup member and housed in said dust cap and secured at its upper end to said bracket, said spring surrounding said shaft within the dust cap.

3. A device of the character described comprising a lower fixed member, an upper member slidably mounted with respect to the lower member, a spring bearing between said members, a forwardly and rearwardly extending horizontally disposed bracket secured to the upper end of the uppermost of said members, a plate hingedly connected to the rear end of said bracket by a transversely extending hinge element, and a seat carried by said plate, said seat being adapted to be thrown bodily rearwardly upon said hinge to remove it completely from its over-lying position with respect to the uppermost of said telescopic members.

In testimony whereof I affix my signature.

ALBERT BREVICK.